Figure 1:
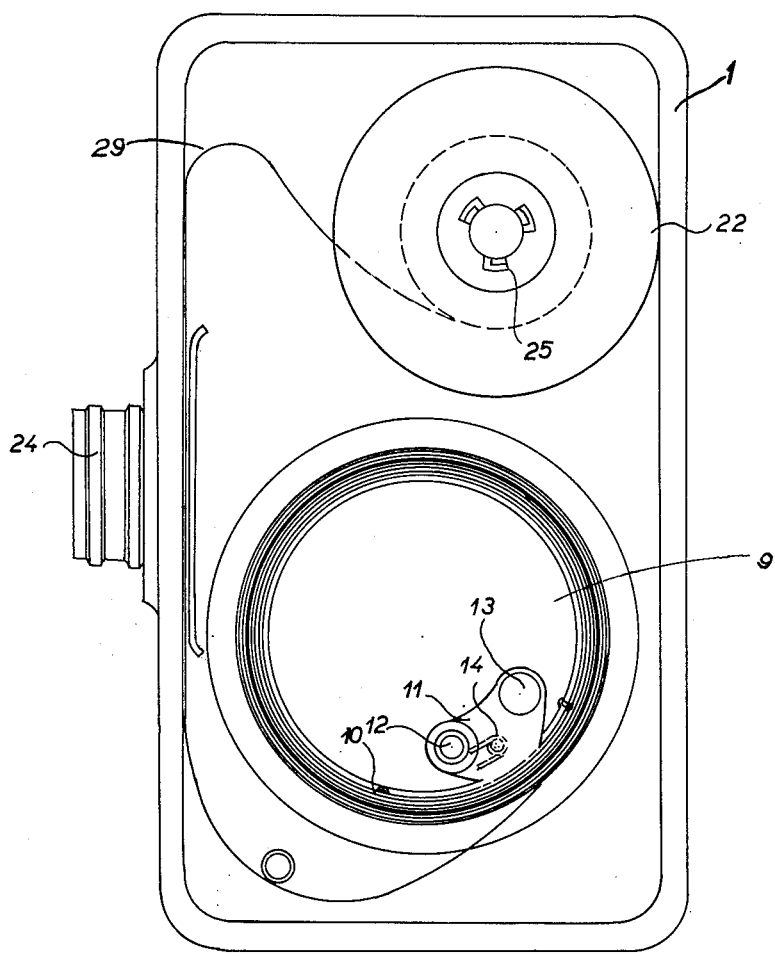

Nov. 14, 1961  J. HAMPL  3,008,660
CINEMATOGRAPHIC CAMERA
Filed April 30, 1959  2 Sheets-Sheet 1

INVENTOR.
Jan Hampl
BY

Nov. 14, 1961 J. HAMPL 3,008,660
CINEMATOGRAPHIC CAMERA
Filed April 30, 1959

INVENTOR.
Jan Hampl 3,008,660
CINEMATOGRAPHIC CAMERA
Jan Hampl, Prerov, Czechoslovakia, assignor to Meopta Prerov, narodni podnik, Prerov, Czechoslovakia
Filed Apr. 30, 1959, Ser. No. 809,966
Claims priority, application Czechoslovakia May 2, 1958
3 Claims. (Cl. 242—55.11)

The present invention relates to a motion picture camera for consecutively taking two rows of pictures on two lateral halves of a film which travels in opposite directions behind the gate-aperture of the camera during the taking of the respective rows of pictures.

This method of taking pictures is used in particular in 8 mm. cameras. The film proceeds first in one direction until one lateral half thereof is exposed and the film is wound either on a take-up reel which is a permanent element of the camera mechanism, or on a winding core in the case of a magazine camera. The wound spool or the magazine has then to be taken out of the camera and is re-inserted so as to permit the other half of the film to pass behind the gate-aperture while the film is run off in the opposite direction.

Motion picture cameras employ film which is either wound on spools or held in special magazines. The magazines have the advantage of easy insertion into the camera, but they are highly vulnerable, bulky, and their manufacture requires high precision and is therefore expensive. Spools, on the contrary, are cheaper and less voluminous. It is a disadvantage of the spools that they are difficult to insert in the camera and the fastening of the free end of the film to the take-up reel by insertion into a slot in the core of the latter causes particular difficulties.

Known motion picture cameras of a special type for taking two rows of pictures on one film avoid the second insertion of a free film end when the direction of film travel is reversed and thus achieve some of the advantages of the spool as well as of the magazine. In such cameras, after exposure of one row of frames is completed, the lens with the gate is shifted laterally to a position in which the optical axis of the lens is aligned with the second lateral half of the film, the direction of film travel is reversed, and the camera is turned 180° to produce a second row of pictures. Removal of the film from the camera prior to reversal of film movement is thus unnecessary. The film when mounted on a conventional spool, needs to be attached to a take-up reel in the camera but once.

It is a primary object of this invention further to improve a camera of the type described so as to facilitate film handling.

Another object is the elimination of the need for attaching a free film end to the take-up reel by insertion in a slot in the latter.

Figure 2:
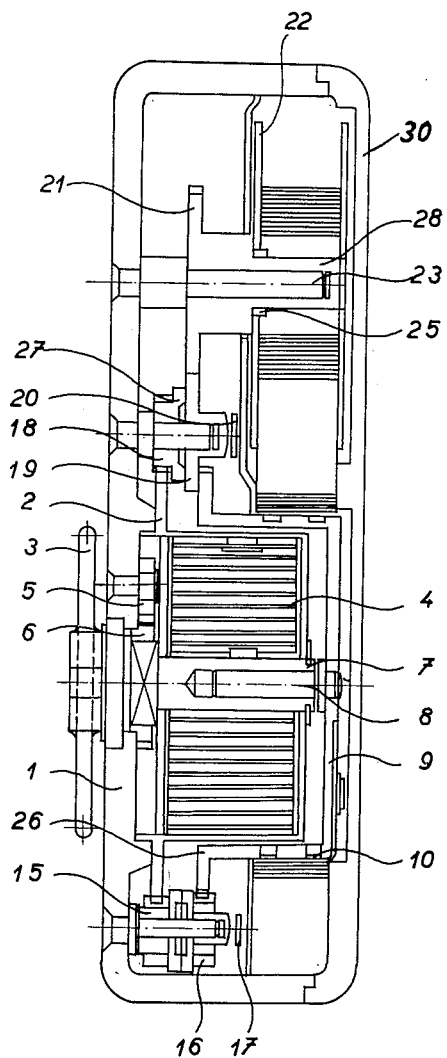

Other objects and many of the attendant advantages of this invention will be readily appreciated as the same becomes better understood by reference to the following description of a preferred embodiment when considered in connection with the accompanying drawing wherein:

FIG. 1 is a side elevational view of a motion picture camera of the invention with the cover removed; and FIG. 2 shows the camera of FIG. 1 in front elevational section on the line II—II.

Referring now to the drawing, and initially to FIG. 1, there is shown a motion picture camera having a housing 1 from which the cover has been removed to reveal elements of the film threading mechanism. The film 29 is unwound from a conventional spool 22, which is engaged by driving lugs 25, and is passed in a loop behind the gate associated with an objective 24 which is mounted on the housing 1 for shifting movement in a direction transverse of the direction of film movement as described above.

The film is wound on a take-up drum 9, and its free end is secured to the drum by catches 10 on the drum 9 which are spring biassed in the direction towards the film and adapted to engage its perforation. In order to prevent the film from slipping out of engagement with the catches even in the first turn, the film is urged against the catches 10 by a clamping bracket 11 which is hingedly fastened to the drum 9 by means of an axial pivot pin 13. The bracket 11 carries a button 12 and has a cylindrically shaped portion which conforms to the cylindrical face of the drum 9 against which it is urged by a spring 14. By pressing the button 12 in a radially outward direction, the bracket 11 is turned around the pivot 13, and the cylindrical portion of the bracket 11 is slightly removed from the take-up drum 9. The end of the film needs only be inserted until it abuts against the bracket 11. When the pressure on the button 12 is released, the bracket 11 swings back and is pushed by the spring 14 against the surface of the take-up drum 9, pressing thus the film 29 against the catches 10.

In the apparatus according to the present invention it is therefore not necessary to search for a lateral slot in the core of a spool, when inserting a film. When the bracket 11 is permitted to snap into position, the film is retained by the catches 10, whereupon it is entrained by the drum 9.

The drum 9 has a relatively large diameter and can thus serve as a housing for the clockwork mechanism so that the overall dimensions of the camera are smaller and the drive mechanism is simpler, because the drum can have the same rotary speed as the output of the clockwork with which it is in operative engagement.

FIG. 2 shows the camera of FIG. 1 in front-elevational section. The housing 1 of the camera is closed by a removable cover 30 which in the closed condition of the camera housing 1 is located closely adjacent the cylindrical face of the drum 9 for holding the film 29 in place thereon. The output gear 2 of the clockwork mechanism is actuated by a spiral spring 4 wound by means of a key 3. Running down of the spring is prevented by a pawl 5 and ratchet-wheel 6. The central shaft 7 of the clockwork is hollow and is journaled on an axle 8 riveted to the drum 9.

The other side of the drum is widened to form a flange which carries a gear rim 26. The gear rim is releasably engaged with the gear 2 by two gear-wheels 15 and 16 which respectively form the input and output of a frictional clutch. A rocker-arm 17 urges the gear wheel 16 into frictional engagement with the wheel 15 for transmitting winding-up motion to the film attached to the drum 9.

As long as the film is being wound on the drum 9, the spool 22 which is of a conventional type rotates freely on the shaft 23. When the first row of frames has been exposed, the objective 24 is shifted to a position of optical alignment with the other row of frames, and the camera is turned around a horizontal axis so that the fully loaded drum 9 is now on top and the spool 22 becomes a take-up spool. By shifting the objective 24 in the described way, the drive mechanism may be automatically reversed in a manner known per se. In the camera shown in FIG. 2, film movement for exposure of the second row of frames is initiated by releasing the rocker-arm 17 and actuating a rocker-arm 20.

The rocker arm causes engagement of a clutch 27 the input and output of which are respectively formed by gear wheels 18 and 19. The wheel 18 meshes permanently with the output gear 2 of the clockwork mechanism of the camera, whereas the wheel 19 engages a spur gear 21 which is journaled on the shaft 23, and carries a cylindrical sleeve 28 to which the lugs 25 are fixedly fastened for driving engagement with corresponding recesses in the spool 22.

When the rocker arm 20 urges the gear wheel 19 into engagement with the wheel 18, a power transmission train is set up for drawing the film 30 from the drum 9 and for rewinding it on the spool 22.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What I claim is:

1. In a motion picture camera, a housing; a spool member releasably mounted in said housing for rotation about an axis, whereby one end of a film may be wound and unwound on said member; a drum member rotatable in said housing about an axis substantially parallel to the axis of said spool member, said drum member being formed with a cavity therein, and having a cylindrical face for winding and unwinding the other end of said film thereon; clamping means for clamping an end of said film to said cylindrical face; actuating motor means in said cavity; and motion transmitting means for selectively transmitting movement of said motor means to one of said members, said clamping means including catch means radially projecting from said cylindrical face for engaging a perforation of said film; bracket means pivoted to said drum member for pivotal movement of a portion of said bracket means toward and away from said catch means about a pivoting axis substantially parallel to said axes and spaced radially inward from said cylindrical face, said portion of said bracket means being cylindrical and conforming to said cylindrical face when adjacent said catch means; resilient means permanently urging said portion to move toward said catch means; and means for actuating movement of said portion away from said catch means.

2. In a motion picture camera as set forth in claim 1, said motion transmitting means including two clutches selectively engageable with said motor means and with a respective one of said members for transmitting movement of said motor means to said member.

3. In a motion picture camera as set forth in claim 1, said housing having an internal wall axially adjacent said cylindrical face of said drum member for guiding said film on said face.

References Cited in the file of this patent

UNITED STATES PATENTS

| 1,164,999 | Duffey | Dec. 21, 1915 |
| 1,389,500 | Goodrich et al. | Aug. 30, 1921 |
| 1,497,166 | Canfield | June 10, 1924 |
| 2,106,374 | Goldhammer et al. | Jan. 25, 1938 |
| 2,172,438 | De Heer | Sept. 12, 1939 |
| 2,226,363 | Williams | Dec. 24, 1940 |
| 2,503,453 | Pratt et al. | Apr. 11, 1950 |
| 2,732,754 | Foster et al. | Jan. 31, 1956 |

FOREIGN PATENTS

| 244,071 | Switzerland | Mar. 1, 1947 |
| 637,440 | Germany | Oct. 28, 1936 |
| 888,787 | France | Dec. 22, 1943 |